Patented July 7, 1942

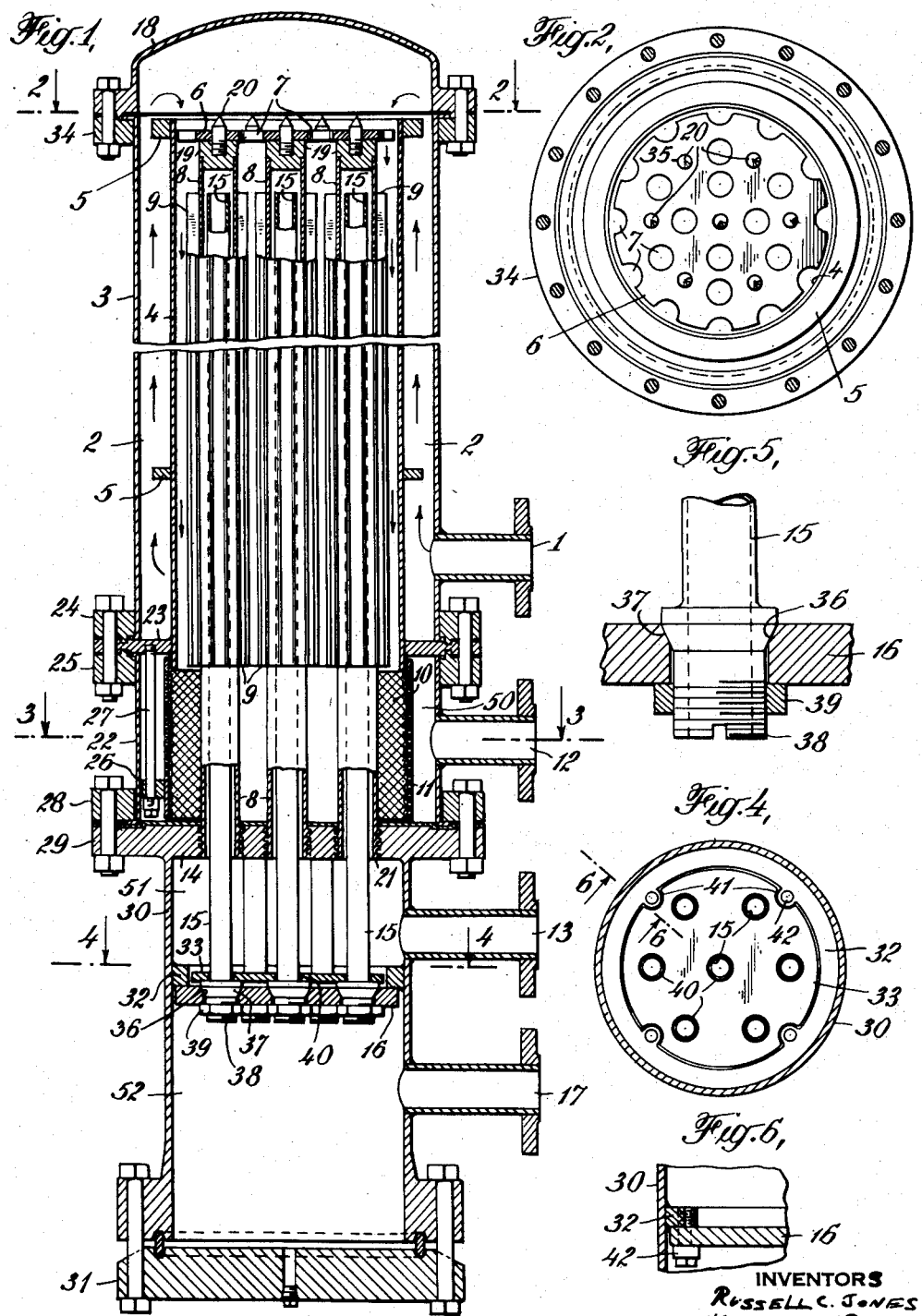

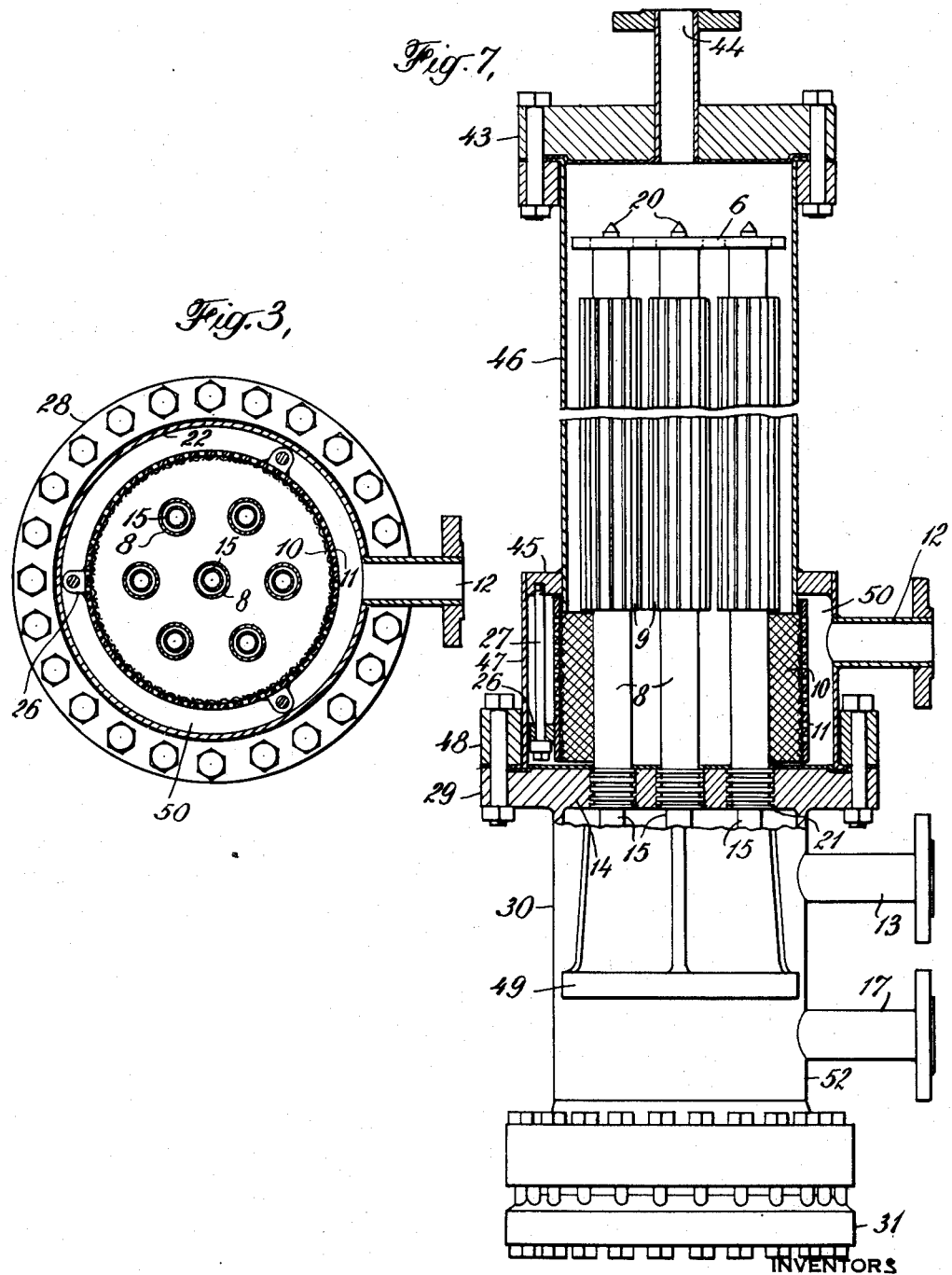

2,288,951

UNITED STATES PATENT OFFICE 2,288,951

APPARATUS FOR CARRYING OUT CATALYTIC REACTIONS

Russell C. Jones, Bronxville, Kenneth B. Ris, Garden City, and Julius Benzinger, Queens Village, N. Y., assignors to The Griscom-Russell Company, New York, N. Y., a corporation of Delaware Application May 12, 1939, Serial No. 273,214

5 Claims. (Cl. 23—288)

This invention relates to improvements in apparatus for use in carrying out gas phase exothermic reactions such, for example, as employed in certain processes of petroleum refining. The object of the invention is to produce a more efficient, reliable, and accessible apparatus than has been heretofore available.

The particular catalytic reaction for which the apparatus selected for illustration is specifically designed is highly exothermic and marked by extreme temperatures—in hot spots as high as 1300° F. and generally about 1150° F. This reaction is cooled by a fluid salt mixture circulating at between 950°–975° F. The catalyst is a dry aggregate—⅛" to ¼" in diameter—and produces dust. The reactant is gas, under medium pressure, entering at about 900° F.

The customary apparatus utilized consists of a jacket surrounding a plurality of tubes set in tube sheets at top and bottom thereof, with an intake header chamber above the upper tube sheet and outlet header chamber below the lower tube sheet, the latter chamber being divided by a plane horizontal wire screen into two compartments, the upper adjacent to the lower tube sheet and the lower connecting directly with the outlet. The cooling fluid salt is circulated in the jacket; the tubes are filled with catalyst which is kept from leaving the reactor by the wire screen; and the reactant is passed through the catalyst under pressure from intake to outlet.

The operation of this usual apparatus has several defects, the chief of which are insufficiency of cooling, producing objectionable and dangerous hot spots; increasing inefficiency of reactant flow as the dusting of the catalyst piles up on and below the relatively small area of the retaining screen in a more and more impervious layer of fine material; and difficulty of disassembling the apparatus when clean-out or repair is necessary, the cooling medium having a freezing point above ordinary temperatures.

Broadly, we have solved these specific problems and increased the efficiency and reliability of catalytic reactors generally by placing the catalyst in the jacket, passing the reactant through it and out through a "napkin-ring" vertical wire screen, while cooling the catalyst by circulating through it fluid salt in longitudinally-finned tubes, with fins omitted within the circumference of the screen. The use of the "napkin-ring" screen with the omission of the fins prevents, or substantially reduces clogging of the reactant circulation; the use of the finned tubes to circulate the cooling medium insures even and efficient temperature regulation. The use of finned tubes for the circulation of the cooling medium in the catalyst body also permits a substantial reduction in the overall dimensions of the apparatus for the same catalyst bulk. The provision of an extended external heat-absorbing surface in contact with the catalyst tubes permits the use of tubes of very much smaller diameter or by the use of fewer tubes than would be possible were plain tubes employed, the rate of heat absorption by the cooling fluid being several times greater than the rate of absorption from the catalyst.

In addition, in this reactor the use of stuffing boxes is completely avoided, all points of differential expansion being full-floating. This is particularly desirable, since the stuffing boxes necessary on the customary catalyst reactors are a fertile source of trouble when using the extreme temperatures involved.

While the apparatus just described represents a valuable solution of the problems presented, the use of the jacket to contain catalyst and reactant under pressure at very high reaction temperatures subjects the walls of the jacket to extreme temperature stress at temperatures within or closely approaching the critical range. To prevent breakdown of the walls of the vessel where such extreme temperatures are encountered, we provide a double walled shell with the intake for the reactant in the bottom of the outer shell which surrounds the catalyst chamber proper, relieving it of pressure, and greatly reducing the temperature stress in its walls. The temperature stress on the outer vessel is considerably less than when a unitary catalyst chamber is used, and the heat of the vessel is well below the critical temperature range.

For a detailed consideration of what we believe to be novel in our invention, and for a close description of the construction of two suggested embodiments thereof, attention is directed to the following specification, the appended claims, and the accompanying drawings, of which latter Fig. 1 is a vertical section through one embodiment of our invention;

Fig. 2 is a horizontal section taken on the line 2—2 of Fig. 1;

Fig. 3 is a horizontal section taken on the line 3—3 of Fig. 1;

Fig. 4 is a horizontal section taken on the line 4—4 of Fig. 1;

Fig. 5 is a vertical section through a detail of the lower tube sheet showing the fastening of one tube therein;

Fig. 6 is a partial cross-section on the line 6—6 of Fig. 4; and

Fig. 7 is an elevation, partly in vertical section, of a modified form of our invention.

In Figs. 1–6 is shown a preferred form of our invention. Its operation in carrying out the above mentioned reaction is, briefly, as follows:

The reactant gas is admitted by the inlet 1, passes upward under pressure through the annular passage 2 between the shell 3 and the catalyst container 4 past the reinforcing rings 5 and down through the gas-passage holes 7 in the floating tube positioning plate 6 into the catalyst container 4. The catalyst is distributed in this container 4 around the outer cooling tubes 8, whose effetcive area is greatly increased by the fins 9. The reactant passes down through the catalyst, a dry, granular aggregate, and out through the "napkin-ring" wire screen 10 which is reinforced by the perforated annular supporting plate 11, into the annular passage 50 between the plate 11 and the screen casing 22, and out of the apparatus by the reactant outlet 12.

The reaction produced by this circulation is exothermic, and the catalyst and reacting chamber proper must therefore be cooled. This is done by circulating a cooling fluid salt, at around 950° F., in tubes through the reacting chamber where the reaction is taking place at temperatures around 1200–1300° F. This cooling fluid enters the salt header 30 by the inlet 13, passes up the annular passage between the outer cooling tubes 8 and the inner tubes 15, the cooling process being materially aided by the fins 9. Fins are omitted within the circumference of the "napkin-ring" wire screen 10, where the flow of the reactant must turn from vertical to transverse, to avoid congestion of that flow. The cooling fluid passes to the top of the outer cooling tubes 8 which are sealed by the plugs 19 and down the inner tubes 15, whose upper ends are a short space below the inner surfaces of the plugs 19, into the lower chamber of the salt header 30 and out the cooling fluid outlet 17.

The reactor shown in Figs. 1–6 consists of a shell 3, into which the reactant gas enters. It is provided with an upper flange 34, to which is bolted the head 18, and a lower flange 24. Inside this shell 3 is a catalyst container 4, in shape an open cylinder with reinforcing rings 5. This container 4 has at the bottom the flange 23, which is bolted between the lower flange 24 of the shell 3 and the upper flange 25 of a screen casing or lower shell section 22. The flange 23 divides the annular space between the outer shell and the inner container into upper and lower annular passages. The upper passage 2 is provided with the gas inlet 1 and communicates with the open end of the catalyst container 4, while the lower chamber constitutes an outlet passage 50 having a port 12 through which the reaction products are discharged. Also supported by the flange 23 of the container 4 is an annular, or "napkin-ring," screen which forms in effect a perforated lower portion or continuation of the container 4.

By means of the lugs 26 the perforated annular supporting plate 11 of the "napkin-ring" wire screen 10 is separably fastened to the catalyst container flange 23 by the bolts 27.

The screen casing 22, bearing the reactant outlet 12 is bolted by its lower flange 28 to the upper flange 29 of the salt header 30. The upper wall 14 of the header 30 divides the annular outlet passage 50 of the reactant gases from the salt inlet chamber 51, and serves as an upper tube sheet into which the outer cooling tubes 8 are rigidly affixed in multigrooved joints 21. These tubes 8 extend upward nearly to the top of the catalyst container 4, bearing the longitudinal fins 9 from the bottom to the top of said container 4, but being bare whereby they extend inside the "napkin-ring" wire screen 10 in order to promote the free transverse circulation of reactant in this region. At their tops the outer cooling tubes 8 are sealed by the plugs 19 into which are threaded the positioning studs 20. These studs 20, fitting closely in the holes 35 of the floating tube positioning plate 6, space the tubes 8 within the catalyst chamber 4.

Within the outer cooling tubes 8, and extending nearly to the inner face of the plugs 19, are the inner tubes 15. These tubes 15 carry the salt down to the cooling fluid outlet 17, passing through the inlet chamber 51 of the salt header 30. This inlet chamber 51 is divided from the outlet chamber 52 by the lower tube sheet 16 into which the lower ends of the tubes 15 are rigidly, but removably, fastened. The lower tube sheet 16, as shown in Figs. 1–6, is bolted to the ring 32, welded inside the salt header 30, by the studs 42 (see Fig. 6).

As shown in Fig. 5, the lower ends of the inner tubes 15 have downward and inwardly beveled shoulders 36 on the lower faces of collars 53, integral with the inner tubes 15, which at the extreme lower end bear threads 38. The nuts 39, by means of these threads 38, draw the shoulders 36 into tight contact with the complementary bevel seats 37 of the lower tube sheet 16. The assembly of the inner tubes 15 and the lower tube sheet 16 in final position is greatly facilitated by the centering plate 33 which fits snugly into the ring 32 and the notches 41 of which accurately position the inner tubes 15 and their bevel shoulders 36 for clamping securely to the lower tube sheet 16.

The bottom of the salt header 30 is sealed by a bolted head 31. Disassembly of the cooling system is accomplished by removing this head 31 and unfastening the inner tube sheet 16 from the ring 32. This opens both chambers of the salt header 30 and the inner and outer tube systems to straight line clean-out, a great advantage when, as here, the cooling fluid is frozen at ordinary temperatures.

In Fig. 7 we have shown a simplified and cheaper form of apparatus which may be used where the temperature and pressures are not so high as to affect the metal of the reaction chamber. As here shown, the salt header 30 with its intake 13 and outlet 17, shown partly in elevation, revealing the integral supporting braces 49, and partly in section, revealing the inner tubes 15, upper tube sheet 14, and multigroove joints 21, is identical with the salt header 30 shown in the embodiment of our invention illustrated in Fig. 1. So are the outer cooling tubes 8 and fins 9, the floating tube positioning plate 6 and studs 20, the "napkin-ring" wire screen 10 and perforated annular supporting ring 11. All this is covered by a unitary welded jacket 46, which contains the catalyst directly and is, as well, the outer shell. To this jacket 46 near the bottom is welded the flange 45. The "napkin-ring" wire screen 10 and supporting ring 11 are bolted to this flange by the bolts 27 through the supporting ring lugs 26. To the outer edge of the flange 45 is welded the casing 47 which terminates in the flange 48. By this flange 48 the jacket 46 and casing 47 are bolted to the upper flange 29 of the salt header 30.

The jacket 46 is closed at the top by the head 43 in the center of which is the reactant inlet 44. In the modification of our invention shown in Fig. 7, the reactant enters by the inlet 44 and passes straight downward through the catalyst in the jacket 46 between the fins 9 of the outer cooling tubes 8, through the "napkin-ring" wire screen 10 into the annular passage 50 formed by the casing 47 and supporting ring 11, and finally out the outlet 12. The fluid salt circulating in the outer cooling tubes 8 passes from the inlet 12 to the outlet 17 exactly as hereinbefore described in connection with the modification of our invention shown in Fig. 1.

We have described the specific embodiment of our invention selected for illustration as used for carrying out exothermic reactions. The same apparatus may be used with similar advantages in carrying out endothermic reactions. In many such reactions it is necessary to supply heat from an outside source to make up for the heat taken out of the reaction gases and the catalyst by the reaction in order to maintain a temperature favorable for the reaction. The apparatus herein described can be used without change for reactions of this character by heating the medium circulated in the tubes in suitable apparatus external to the converter, instead of cooling such medium as required for exothermic reactions, and it is to be understood that the expression "heat absorbing fluid" as used in the specification and claims is used in a descriptive and not a limiting sense to designate the fluid used for controlling the temperature of the reaction chamber, whether by removing or supplying heat.

The foregoing embodiments of our invention were selected by way of illustration merely, and serve to explain the scope of our invention without limiting it to the specific structures shown, except in so far as recited in the appended claims. In said claims we have referred to the passages for the gases and cooling fluid as inlet and outlet passages according to the direction of flow of those fluids as described in the specification, but it is obvious that the direction of flow of either or both fluids may be reversed, if desired, and the claims are not to be construed as limited in this regard.

We claim:

1. In a reactor for catalytic reactions at high temperature and pressure the combination of a shell for containing a granular catalytic agent, a tube sheet at the bottom of said shell, longitudinally finned tubes projecting vertically upward from said tube sheet into the mass of catalytic agent supported on said tube sheet, the fins on said tubes being discontinued for a portion of the length of said tubes at the lower ends thereof, means for circulating a heat absorbing medium in said tubes, the portion of the wall of said shell adjacent said tube sheet and adjacent the portion of said tubes not finned being perforated for the passage of the reacting gases from the catalyst chamber, and means for conducting the reactant gases to the upper end of said shell.

2. In a reactor for catalytic reactions at high temperature and pressure the combination of a shell for containing a granular catalytic agent, a tube sheet at the bottom of said shell, tubes longitudinally finned on the upper portion of their length, said tubes projecting vertically upward from said tube sheet into the mass of catalytic agent supported on said tube sheet, the ends of the tubes adjacent the tube sheet being plain, means for circulating a heat absorbing medium in said tubes, a portion of the wall of said shell adjacent said tube sheet being perforated for the passage of reacting gases from the catalyst chamber, a flange affixed in fluid-tight relation circumferentially around said shell directly above the perforate portion thereof, a pressure-bearing imperforate concentric wall sealed to said flange and said tube sheet surrounding the perforated portion of said shell to provide an annular gas passage, a connection for the outflow of gases in said imperforate wall, and means for conducting the reactant gases to the upper end of said shell.

3. In a reactor for catalytic reactions at high temperature and pressure, the combination of a supporting tube sheet, an outer vertical shell supported on said tube sheet, an inner shell of less diameter than the outer shell concentric therewith and carried thereby spaced above said tube sheet, an annular screen disposed as a prolongation of the wall of said inner shell from the lower edge thereof to said tube sheet, said inner shell and said screen forming a container for a mass of granular catalyst supported on said tube sheet, a horizontal partition above said screen dividing the annular space between the two shells, tubes for circulating a heat absorbing medium affixed in said tube sheet extending vertically upward into the mass of catalyst, a passage at the upper end of the shell between the annular space and the interior of the inner shell, and gas passages for the inflow and outflow of the reacting gases in the outer shell on the opposite sides of said partition.

4. In a reactor for high temperature and pressure catalytic reactions, the combination of a vertical container for the catalytic agent, a tube sheet forming the bottom thereof, a plurality of dead end heat exchanger tubes sealed in said tube sheet and projecting into said container, a header sealed to the other side of said tube sheet and communicating with said tubes, said header having an internal circumferential flange spaced below said tube sheet, a second tube sheet detachably sealed to the under side of said flange, tubes of smaller diameter detachably sealed into said second tube sheet and projecting into said first mentioned tubes, a spacing plate perforated to pass snugly over said smaller tubes and of a diameter less than the inside diameter of said flange whereby the lower ends of said smaller tubes are maintained in their proper relative positions after insertion in said first mentioned tubes and prior to sealing in said second tube sheet, said spacing plate resting on said second tube sheet when the apparatus is assembled, and passages for the inflow and outflow of the heat absorbing medium in the wall of said header above and below said second tube sheet.

5. In a reactor for catalytic reactions at high temperature and pressure, the combination of a tube sheet supporting a mass of granular catalytic agent, heat-exchange tubes projecting vertically upward into said mass from said tube sheet, means for circulating a heat absorbing medium in said tubes, a container assembly sealed in fluid-tight relation to said tube sheet and surrounding said mass comprising an imperforate cylindrical base portion engaging said tube sheet, an inwardly-extending circumferential flange sealed to the top of said base portion, a vertical shell of smaller diameter than said base portion sealed to the inner wall of said flange extending upwardly from said flange and projecting slightly below it, and an annular screen fitted snugly around the downward projecting portion of said shell and extending downwardly to said tube sheet whereby said screen constitutes a container confining the mass of catalyst supported on said tube sheet, said screen being of smaller diameter than said base portion and concentric therewith to provide between said base portion and said screen an annular gas passage.

RUSSELL C. JONES.
KENNETH B. RIS.
JULIUS BENZINGER.